US009129106B2

(12) United States Patent
Sharif et al.

(10) Patent No.: US 9,129,106 B2
(45) Date of Patent: Sep. 8, 2015

(54) SYSTEMS AND METHODS FOR SECURE IN-VM MONITORING

(75) Inventors: Monirul Islam Sharif, Atlanta, GA (US); Wenke Lee, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 436 days.

(21) Appl. No.: 13/508,314

(22) PCT Filed: Nov. 4, 2010

(86) PCT No.: PCT/US2010/055507
§ 371 (c)(1),
(2), (4) Date: Aug. 23, 2012

(87) PCT Pub. No.: WO2012/039726
PCT Pub. Date: Mar. 29, 2012

(65) Prior Publication Data
US 2013/0091568 A1    Apr. 11, 2013

Related U.S. Application Data

(60) Provisional application No. 61/258,033, filed on Nov. 4, 2009.

(51) Int. Cl.
*G06F 21/50* (2013.01)
*G06F 9/455* (2006.01)
*G06F 21/62* (2013.01)

(52) U.S. Cl.
CPC .......... *G06F 21/50* (2013.01); *G06F 9/45558* (2013.01); *G06F 21/6227* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| 8,032,897 B2* | 10/2011 | Serebrin ........................ 719/318 |
| 8,250,519 B2* | 8/2012 | Budko et al. .................. 717/100 |
| 8,510,756 B1* | 8/2013 | Koryakin et al. ............. 719/318 |
| 8,719,823 B2* | 5/2014 | Subrahmanyam et al. ... 718/101 |
| 8,763,115 B2* | 6/2014 | Budko et al. .................... 726/22 |
| 2005/0268112 A1 | 12/2005 | Wang et al. |

(Continued)

OTHER PUBLICATIONS

International Search Report and Written Opinion dated Mar. 6, 2012 for related PCT Patent Application No. PCT/US2010/055507.

*Primary Examiner* — Michael R Vaughan
(74) *Attorney, Agent, or Firm* — Troutman Sanders LLP; Ryan A. Schneider; Christopher Close, Jr.

(57) ABSTRACT

Security systems can provide secure and efficient in-VM monitoring. An exemplary security system can be built upon hardware virtualization features and can comprise a virtual machine having a plurality of standard virtual address spaces, as well as a hidden virtual address space. While the standard virtual address spaces can be directly accessible by a kernel in the virtual machine, the hidden virtual address space can be hidden from the kernel, which can be absent a virtual page table corresponding to the hidden virtual address space. A security monitor can reside in the hidden address space, monitoring the kernel without being modifiable by the kernel. A processor can transfer focus from the standard virtual address spaces to the hidden virtual address space only through predetermined entry gates, and the processor can transfer focus from the hidden virtual address space to the standard virtual address spaces only through predetermined exit gates.

14 Claims, 7 Drawing Sheets

(56) References Cited

U.S. PATENT DOCUMENTS

| | | |
|---|---|---|
| 2007/0006226 A1 | 1/2007 | Hendel |
| 2008/0244573 A1* | 10/2008 | Sahita et al. ............ 718/1 |
| 2009/0006714 A1* | 1/2009 | Durham et al. ............ 711/6 |
| 2009/0037936 A1 | 2/2009 | Serebrin |
| 2009/0055571 A1* | 2/2009 | Budko et al. ............ 711/6 |
| 2010/0299665 A1* | 11/2010 | Adams ............ 718/1 |

* cited by examiner

SYSTEMS AND METHODS FOR SECURE IN-VM MONITORING

CROSS-REFERENCE TO RELATED APPLICATIONS

This application is a United States National Stage Application of International Patent Application Serial No. PCT/US2010/055507, filed 4 Nov. 2010, which claims a benefit, under 35 U.S.C. §119(e), of U.S. Provisional Application Ser. No. 61/258,033, filed 4 Nov. 2009. The entire contents and substance of which these two applications are hereby incorporated by reference as if fully set out below.

TECHNICAL FIELD

Various embodiments of the present invention relate to security of computer systems and, more particularly, to secure monitoring of a computer system from within a virtual machine in which an untrusted program executes.

BACKGROUND

Kernel-level attacks or malicious programs, such as rootkits, that compromise the kernel of an operating system are one of the most important concerns in systems security at present. These attacks can run at the same privilege level as the kernel and can thus modify kernel-level code or sensitive data to hide various malicious activities, to change operating system behavior, or even to take complete control of the system. Kernel-level security tools can be crippled and made ineffective by these attacks, which can run, access, and modify these security tools. A large body of research has adopted virtual machine (VM) monitor technology in an effort to mitigate such attacks. A higher privileged hypervisor outside of a virtual machine in which the kernel runs can enforce memory protections and preemptively intercept events throughout the operating system environment.

A major reason for adopting virtualization is to isolate security tools from an untrusted VM by moving those security tools to a separate, trusted, secure VM, and then using introspection to monitor and protect the untrusted VM from inside the trusted VM. Approaches that passively monitor various security properties, by periodically looking inside the untrusted VM for evidence of suspicious activity, have been proposed, but passive monitoring can only detect remnants of an already successful attack. Active monitoring from outside of the untrusted VM, in contrast, has the advantage of detecting attacks earlier and preventing certain attacks from succeeding. Active monitoring from outside of an untrusted VM can be achieved by placing secure hooks inside the untrusted VM, to intercept various events and invoke the security tool residing in a separate secure VM. Because the secure VM is isolated from the untrusted VM, so as to prohibit tampering, switching between the VMs occurs through the hypervisor. But the large overhead for switching between the untrusted VM, the hypervisor, and the secure VM makes this approach suitable only for actively monitoring a few events that occur less frequently during system execution.

Thus, with previous systems and methods, in-VM monitoring provides an inadequate level of security, while monitoring from outside a VM is feasible only when limiting the number and type of events that can be actively monitored, and.

SUMMARY

There is a need for secure in-VM monitoring systems and methods, for monitoring untrusted processes from within the same VM of the trusted process, without being subject to the conventional risks of in-VM monitoring. In an exemplary embodiment, such systems and methods can provide security similar to out-of-VM monitoring, with efficiency similar to conventional in-VM monitoring. It is to such systems and methods that various embodiments of the invention are directed.

Briefly described, various embodiments of the invention are monitoring systems and methods for secure in-VM monitoring. In an exemplary embodiment, a monitoring system can be facilitated by hardware virtualization and can comprise a guest VM, a hidden address space in the guest VM, an entry gate, an exit gate, and a hypervisor.

The guest VM can contain code and data for the kernel of an operating system. One or more applications can run within on the operating system inside the VM, and the operating system can provide each application with its own virtual address space. The kernel can contain virtual page tables for each of the applications, so as to map the virtual address spaces of the applications to an address space of the operating system. The guest VM can also contain a hidden address space, for which the kernel does not have a virtual page table. Thus, the kernel does not have access to the hidden address space. A security monitor, such as part of an antivirus application, can run inside the hidden address space, isolated from the untrusted portion of the guest VM outside of the hidden address space.

The hypervisor can run outside of the guest VM at a higher privilege level than the guest VM. The hypervisor can contain one or more shadow page tables corresponding to the virtual page tables in the guest VM, so as to map the address spaces of the applications and the operating system to a physical address space. The hypervisor can also contain a secure shadow page table for the hidden address space, enabling the hypervisor to map the hidden address space to physical address space.

The entry gate and the exit gate can be code blocks configured to switch the focus of a processor from between an address space of an application running on the operating system and the hidden address space. The processor can access the hidden address space only through an entry gate, and the processor can exit the hidden address space only through an exit gate. In an exemplary embodiment, the entry gate can contain code that first modifies the value in the CR3 register to a physical address corresponding to the hidden address space. With the CR3 register modified to point to the hidden address space, the processor automatically jumps into the hidden address space, where the processor can process code of the security monitor inside the hidden address space. After the security monitor handles an event that triggered the call to the entry gate, the security monitor can then call the exit gate, to return focus to a process executing the guest operating system.

Generally, a call to the hypervisor is performed whenever the CR3 register is modified. The hardware underlying the monitoring system, however, can provide a target list of CR3 values, such that a hypervisor call is not made when the CR3 register value is modified to one of the target values. Thus, to avoid hypervisor calls when focus is switched from the kernel to the hidden address space, the target list can be maintained to include the values to which the entry and exit gates will modify the CR3 register, so as to avoid a hypervisor call when switching into or out of the hidden address space.

The monitoring system can thus provide efficient, secure in-VM active monitoring of untrusted processes in a computer system. Other objects, features, and advantages of the monitoring system will become more apparent upon reading the following specification in conjunction with the accompanying drawing figures.

DETAILED DESCRIPTION

Figure 1:
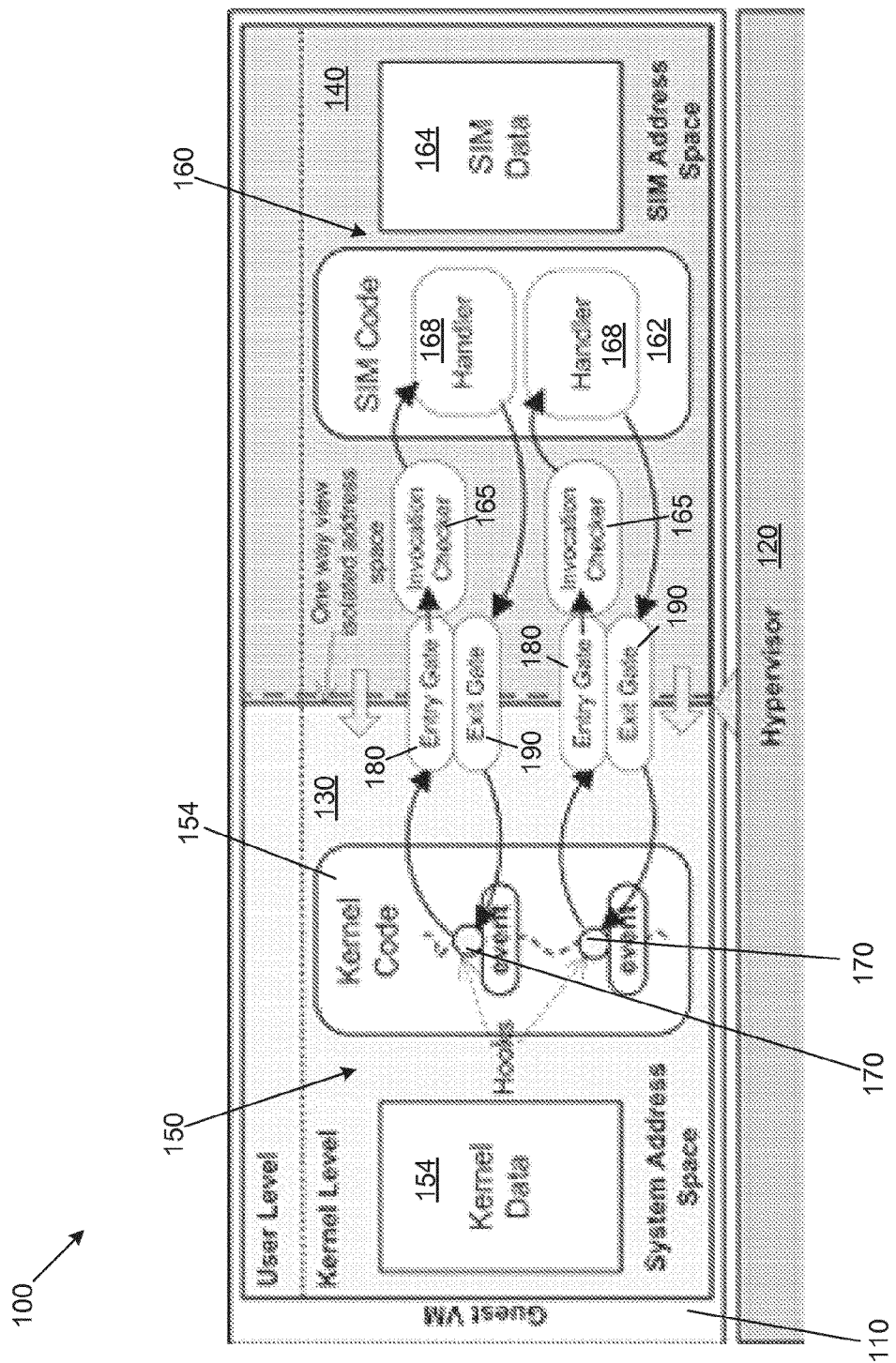
FIG. 1 illustrates a diagram of a monitoring system, according to an exemplary embodiment of the present invention.

To facilitate an understanding of the principles and features of the invention, various illustrative embodiments are explained below. In particular, the invention is described in the context of being a monitoring system for secure and efficient in-VM monitoring of untrusted processes. Embodiments of the invention, however, are not limited to this context. Rather, embodiments of the invention can provide a means to isolate various types of processes, other than just monitor processes, from other processes within a VM.

The components described hereinafter as making up various elements of the invention are intended to be illustrative and not restrictive. Many suitable components that can perform the same or similar functions as components described herein are intended to be embraced within the scope of the invention. Such other components not described herein can include, but are not limited to, similar or analogous components developed after development of the invention.

Referring now to the figures, in which like reference numerals represent like parts throughout the views, various embodiments of monitoring systems and methods for secure in-VM monitoring will be described in detail.

FIG. 1 illustrates a diagram of a monitoring system 100, according to an exemplary embodiment of the present invention. As shown in FIG. 1, the monitoring system 100 can comprise a guest VM 110 and a hypervisor 120, both residing on a computing system 200 (see FIG. 2). The hypervisor 120 can have a higher privilege level within computing system 200 than does the guest VM 110. As a result, the hypervisor 120 can monitor activities of the guest VM 110 without being subject to tampering by any untrusted process in the guest VM 110, which untrusted process would be limited to operation within the guest VM 110.

The guest VM can comprise a system address space 130 and a hidden address space 140. A kernel 150, including both kernel code 152 and kernel data 154, can reside in the system address space 130, while a security monitor 160, or monitoring process, can reside in the hidden address space 140. The hidden address space 140, and thus the security monitor 160, can be hidden from the kernel 150. The monitoring system 100 can be a secure, in-VM monitoring system based on hardware virtualization features. Through the monitoring system 100, the security monitor 160 can securely monitor untrusted processes having the same privilege level and residing in the same VM as the security monitor 160. The monitoring system 100 can be as, or nearly as, secure as an out-of-VM monitoring system, while maintaining an efficiency on par with conventional in-VM monitoring systems. Embodiments of the present monitoring system 100 can achieve this level of security and efficiency by not requiring a privilege transfer when switching to the monitor for an intercepted event, and by enabling the monitor 160 to access the address space of a kernel 150 at native speed.

In the monitoring system 100, a desired level of security can be achieved by isolating the security monitor 160 from the kernel 150, so as to prevent tampering with the security monitor 160 code 162 or data 164 by the kernel 150 or by an untrusted process accessing the kernel 150. As shown in FIG. 1, the guest VM 110 can comprise at least one entry gate 112 and at least one exit gate 114, which can be the only means by which focus is switched between the system address space 130 and the hidden address space 140. Through these protected gates 1124 and 114, the monitoring system 100 can ensure that the security monitor 160 is not tampered with by an untrusted process.

The desired level of efficiency can be achieved by not requiring privilege switches when a process switches focus between the kernel 150 and the security monitor 160. As discussed above, in a conventional out-of-VM approach, a security monitor would be located in a separate VM. In that case, a call would have to be made to the hypervisor 120 to switch focus between to the security monitor 160 when a hook is triggered. In embodiments of the present monitoring system 100, however, isolation can be achieved by putting the monitor code along with its private data in a separate hypervisor protected guest address space that can only be entered and exited through specially constructed protected gates. Because the security monitor 160 can be located inside the guest VM 110 with the kernel 150, a call can be made to the security monitor 160, by way of the entry gate 112, without need for a privilege switch. As a result, normal operation of the security monitor 160 can proceed without hypervisor 120 intervention, but any attempts to breach the security of security monitor 160 can be trapped and prevented by the hypervisor 120.

A key idea of the monitoring system 100 is the use of a separate hypervisor-protected virtual, hidden address space 140 in the guest VM 110. The hidden address space 140 can store the security monitor 160 and can exist in parallel to the virtual address spaces utilized by the kernel 150 of the operating system 216. The virtual memory can be mapped in such a way that the security monitor 160 can have a one-way view of the guest VM's original virtual address space. Thus, while the security monitor 160 can view the address space of the operating system 216, no code executing in the operating system 216 can view the security monitor's hidden address space 140. One or more entry gates 180 and one or more exit gates 190 can be the only code that can transfer execution between the system address space 130 and the hidden address space 140.

As in conventional active monitoring, hooks 170 can be placed in the kernel 150 before specific events to be monitored. When triggered, a hook can transfer control to the entry gate 180, which can in turn transfer control to the security monitor 160. The security monitor's code 162, including handlers for each hook, and data 164 can all be contained within the hidden address space 140, inaccessible except through the entry gate 180. When the security monitor 160 finishes handling the triggered hook, the security monitor 160 can transfer control to the exit gate 190, which can in turn transfer control back to the process in which the hook was triggered.

To achieve active monitoring, a goal of an exemplary embodiment of the monitoring system 100, certain events need to be intercepted. To this end, a set of hooks 170 can be placed in the monitored kernel 150 to invoke corresponding handlers 168 contained the security monitor's code 164. A hook 170 can pass data related to the triggering event that is gathered at the point of the hook 170, thus enabling the handler 168 to analyze and handle the triggering event.

Conventionally, the overhead in executing security tools out of the guest operating system 216 is primarily due to the change in privilege levels that occurs when switching back and forth between the kernel-level 150 and the hypervisor-level 120.

An exemplary embodiment of the monitoring system 100, however, meets performance requirements similar to the performance of conventional in-VM approaches, which do not require these privilege switches to occur when a hook 170 is encountered. For example, performance requirements met by the monitoring system 100 can be as follows:

Fast invocation: Invoking the security monitor's handler 168 for a hook 170 need not involve any privilege level change.

Data read/write at native speed: The monitor code 164 can read and write any system data and local data at native speed, i.e., without hypervisor 120 intervention.

In conventional in-VM monitoring, a direct control transfer to the handler code 168 from the hook 170 initiates the security monitor 160. Moreover, the security monitor 160 can access all data and code because everything is contained in the same address space. But as discussed above, conventional in-VM monitoring lacks a desired level of security. The problem of out-of-VM approaches is that both performance requirements listed above cannot be satisfied. In out-of-VM monitoring, the hypervisor 120 is invoked when the hook 170 is executed to transfer control to the handler 168 residing in another VM. Additionally, the hypervisor 120 usually needs to be invoked to partially map memory belonging to the untrusted VM into an address space in the trusted VM for the out-of-VM monitor.

In addition to meeting performance requirements based on conventional in-VM monitoring, the monitoring system 100 can also meet security requirements that are based on out-of-VM monitoring. To state the security requirements, we consider an adversarial program residing in the same environment as the kernel 150. In this threat model, the adversarial program runs with the highest privilege in the guest VM 110 and therefore can directly read from, write to, and execute from any memory location that is not protected by the hypervisor 120. To ensure the security of the security monitor 160, the monitoring system 100 can meet the following security requirements, on par with those of out-of-VM approaches:

Isolation of the monitor's code 162 and data 164: This ensures the integrity of the monitor's code 162 and data 164 is protected from the adversary. Out-of-VM approaches satisfy this requirement because the adversarial program does not have any means to access a separate, trusted guest VM.

Designated point for switching into the security monitor code 164: Execution should switch to the security monitor 160 only at one of the handlers 168. This requirement can ensure that an attacker does not invoke any security monitor code 162 other than through the designated points of entry. Since the hypervisor 120 initiates entry into the monitor, out-of-VM approaches can ensure this requirement.

A handler 168 is called if and only if the corresponding hook 170 executes: This requirement has two parts: (a) If a hook 170 is reached in the monitored system, then the corresponding handler 168 can be initiated by the system; and (b) a handler 168 can be initiated only if the hook 170 was executed. In out-of-VM approaches, the first requirement can be satisfied by design of the handler dispatcher, and the second requirement can be satisfied because the exact VMCalls that initiated the hypervisor execution can be identified and checked.

The behavior of the security monitor 160 is not maliciously alterable: The execution of handlers 168 should not be maliciously alterable by the adversary. The control-flow of the security monitor 160 thus should not depend on any control-data that is alterable by the attacker. Further, the handlers 168 should not need to call any dependency that is at the control of the adversary. Lastly, after the handler 168 completes, execution should return to a point that is intended by the security monitor 160. An out-of-VM monitor can satisfy these requirements by not using any control-data contained in untrusted VM.

None of the existing in-VM approaches can satisfy all of the above security and performance requirements at the same time. In contrast, an exemplary embodiment of the present monitoring system 100 can improve upon convention in-VM approaches and out-of-VM approaches by meeting all of the above performance and security requirements.

In an exemplary embodiment, the monitoring system 100 can leverage Intel VT hardware virtualization extensions and the virtual memory protections available in standard Intel processors. A prototype has been developed of an embodiment of the monitoring system 100 based on KVM, an open-source virtual machine monitor available as part of mainstream Linux that exclusively uses hardware virtualization features. Microbenchmarks show that, in the exemplary prototype, an invocation of the security monitor 160 in is almost eleven times faster than that of a security monitor 160 residing in a separate VM. According to the microbenchmarks, out-of-VM monitoring introduced an overhead of 690%, which includes external introspection costs, whereas the overhead introduced by the monitoring system 100 was only 13%. Macrobenchmarks carried over a number of representative benchmark programs show an average overhead of 4.15% compared to 46.10% in out-of-VM system call monitoring.

Further details of the monitoring system 100 will be presented following an introduction of various concepts on which embodiments of the present invention build.

Figure 2:
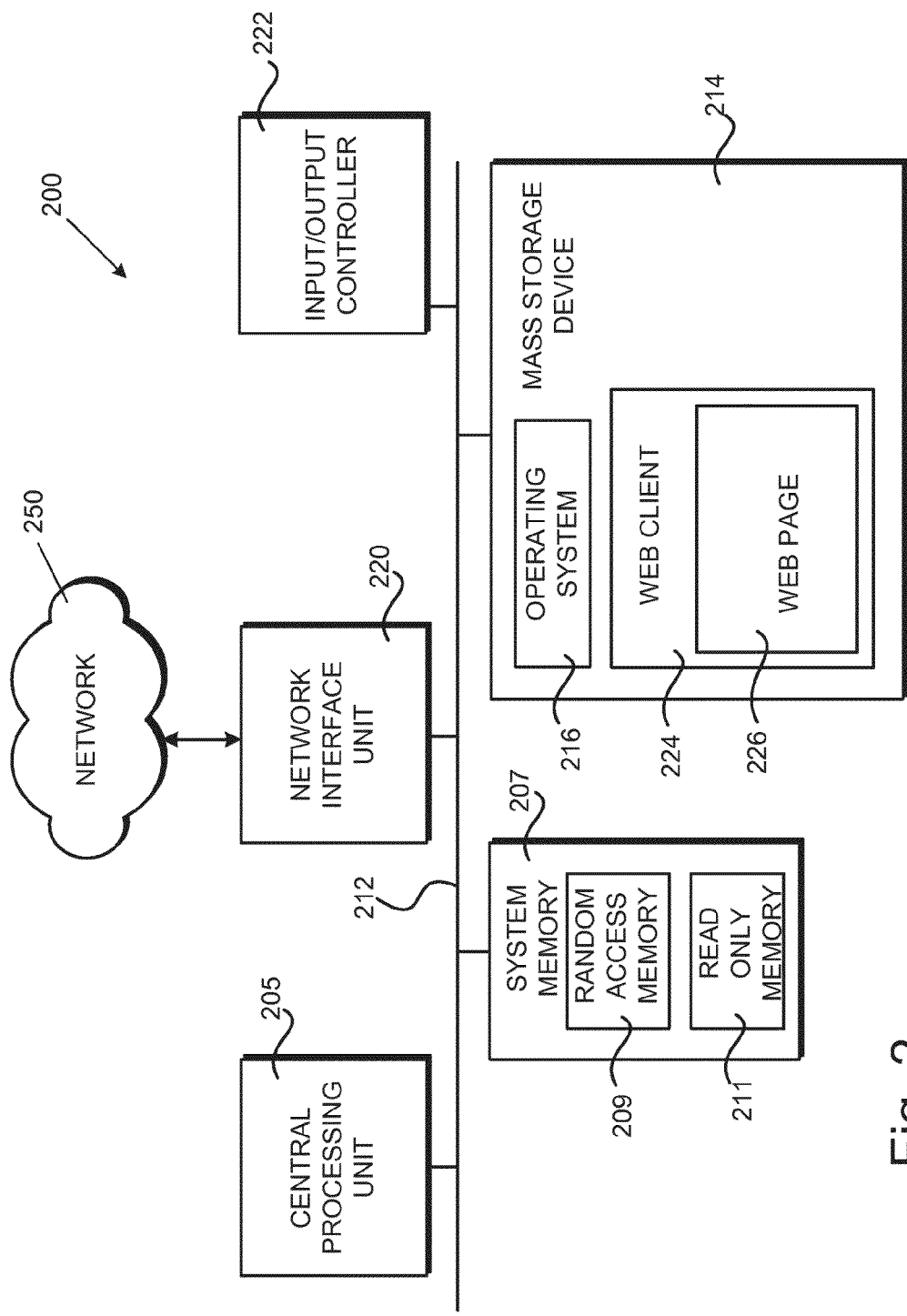
FIG. 2 illustrates an exemplary computing system, on which the monitoring system can operate, according to an exemplary embodiment of the present invention.

FIG. 2 illustrates an exemplary computing system 200, on which the monitoring system 100 can operate, according to an exemplary embodiment of the present invention. As shown in FIG. 2, a computing system 200 embodying the monitoring system 100 can comprise a central processing unit 205, or processor, and one or more system memories 207, such as a random access memory 209 ("RAM") and a non-volatile memory, such as a read-only memory ("ROM") 211. The computing system 200 can further comprise a system bus 212 coupling together the memory 207, the processing unit 205, and various other components. A basic input/output system containing routines to assist in transferring information between components of the computing system 200 can be stored in the ROM 211. Additionally, the computing system 200 can include a mass storage device 214 for storing an operating system 216, application programs, and other program modules.

The mass storage device 214 can be connected to the processor 205 through a mass storage controller (not shown) connected to the bus 212. The mass storage device 214 and other computer-readable media can comprise computer storage media, which can include volatile and non-volatile, removable and non-removable media implemented in any method or technology for storage of information, such as computer-readable instructions, data structures, program modules, or other data. Computer storage media includes, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or various other media used to store data accessible by the computing system 200.

A number of program modules and data files can be stored in the computer storage media and RAM 209 of the computing system 200. Such program modules and data files can include an operating system 216 suitable for controlling operations of the computing system 200, or of the guest VM 110 of the computing system 200. A web browser application program, or web client 224, can also be stored on the computer storage media and RAM 209. The web client 224 may comprise an application program for requesting and rendering web pages 226 created in Hypertext Markup Language ("HTML") or other types of markup languages. The web client 224 can be capable of executing scripts through the use of a scripting host. The scripting host executes program code expressed as scripts within the browser environment.

Computer-readable instructions on the storage media of the computing system 200 can include, for example, instructions for implementing processes of the monitoring system 100. These instructions can be executed by the processor 205 to enable use of the monitoring system 100.

The computing system 200 can operate in a networked environment using logical connections to remote computers over a network 250, such as the Internet. The computing system 200 can connect to the network 250 and remote computers through a network interface unit 220 connected to the bus 212.

The computing system 200 can also include an input/output controller 222 for receiving and processing input from a number of input devices, including a keyboard, mouse, or electronic stylus. Interactions between the input devices and the monitoring system 100 can be detected by the input/output controller 222 to provide meaningful input to the computing system 200. The input/output controller 222 can additionally provide output to a display screen, a printer, or other type of input/output device.

Figure 3:
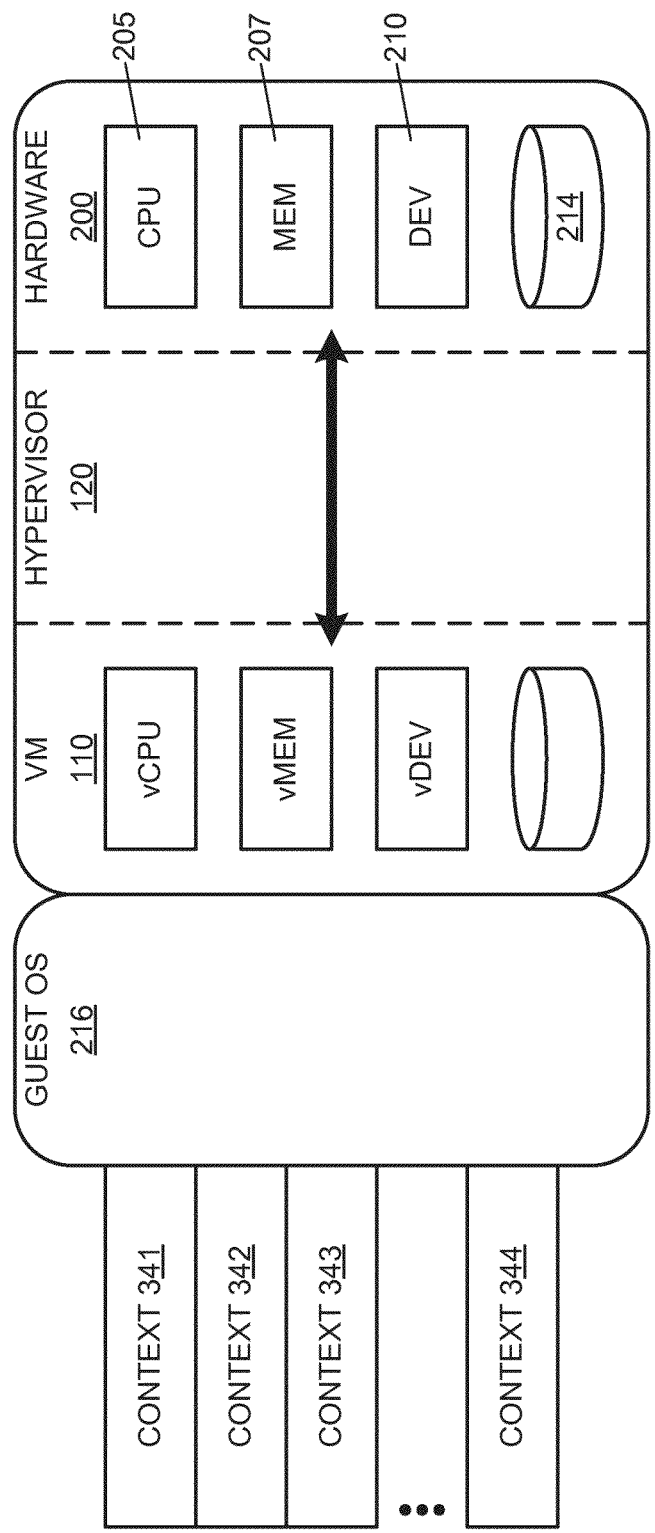
FIG. 3 illustrates a hardware-based virtualization system, which can comprise and build upon the hardware and software components of FIG. 2, and in which the monitoring system can be implemented, according to an exemplary embodiment of the present invention.

FIG. 3 depicts a hardware-based virtualization system 300, which can comprise and build upon the hardware and software components of FIG. 2, and in which an embodiment of the monitoring system 100 can be implemented, according to an exemplary embodiment of the present invention. More specifically, FIG. 3 illustrates a class of virtualization system 300 embodiments in which underlying hardware resources are exported to guest computations as one or more isolated, and apparently independent, virtual machines, e.g., guest VM 110. In the illustrated system 300, a guest operating system 216, e.g., an instance of a conventional Microsoft Windows®, Linux®, or Unix® operating system, can execute in coordination with a guest VM 110, providing application software and operating system services. As is typical of modern operating system design, each application or service can run in its own virtual memory address space and can include one or more execution contexts, e.g., contexts 341, 342, 343 . . . 344, and each context can have an associated instruction pointer. Typically, an execution context, which can also be referred to as a "process," "thread," or "task," includes a set of process registers and a virtual address space.

As on a conventional hardware computer platform, guest operating system 216 can coordinate execution of sequences of instructions on one or more processors 205, can help to maintain memory management and mapping information (e.g., virtual-to-physical page mappings), and can manage devices 210 of the underlying computing system 200. Together, the operating system 216, in the guest VM 110, and underlying computing system 200 can manage context switches amongst various execution contexts based on priority, data or instruction memory access stalls, input/output events, explicit code directives, or other characteristics. Numerous techniques and designs, in both hardware and software, for scheduling and performing context switches in multitasking/multithreaded systems are known and will be understood by persons of ordinary skill in the art.

From the perspective of the operating system 216 and the individual execution contexts, the guest VM 110 appears to be and, indeed, behaves like a conventional hardware computer platform, such as that illustrated in FIG. 2, executing instruction sequences and presenting an apparent processor 205 and memory state. In general, the characteristics and configurations of a virtual machine 110 need not match those of underlying hardware resources, although in many implementations, a correspondence between instruction set architectures of virtual processors and underlying hardware processors 205 may be desirable. Although particular virtualization strategies/designs are described herein, the virtualization system 300 is representative of a wide variety of designs and implementations in which underlying hardware resources are presented to software as virtualized instances of computational systems that may or may not precisely correspond to the underlying physical hardware.

Virtual resources can be presented to the guest VM 110 using mapping or emulation techniques. The hypervisor 120 can be a hardware and/or software interface provided between the guest VM 110 and the various hardware components and devices in the underlying hardware platform, and the hypervisor 120 can provide the necessary mapping and emulation.

Most modern memory hierarchies and processor designs employ or support virtual memory techniques. In general, virtual memory implementations can provide a mechanism that allows a computational system to map from a virtual address space to a physical address space. Building on virtual-to-physical mappings, modern computational systems can present software with an apparent memory space that is a different size than underlying physical memory and that appears to be contiguous, although in reality the memory allotted to a particular application can be a non-contiguous, collection of memory blocks. In this manner, an application can run more efficiently, and the virtualization system 300 can protect certain portions of memory by isolating those portions from computations or processes.

Paged virtual memory is by far the most common form of virtual memory supported by modern processors and memory architectures and by the operating systems that execute thereon. In typical paged virtual memory implementations, the address space of a process or set of processes can be organized as a collection of blocks, or pages, of contiguous virtual memory addresses. The virtual memory addresses employed or manipulated by an application can be translated or mapped to corresponding physical addresses used by hardware to reference specific locations in physical memory. Typically, virtual memory implementations can encode mappings from virtual address spaces to a physical address space using page tables, which are typically maintained by the operating system.

Figure 4:
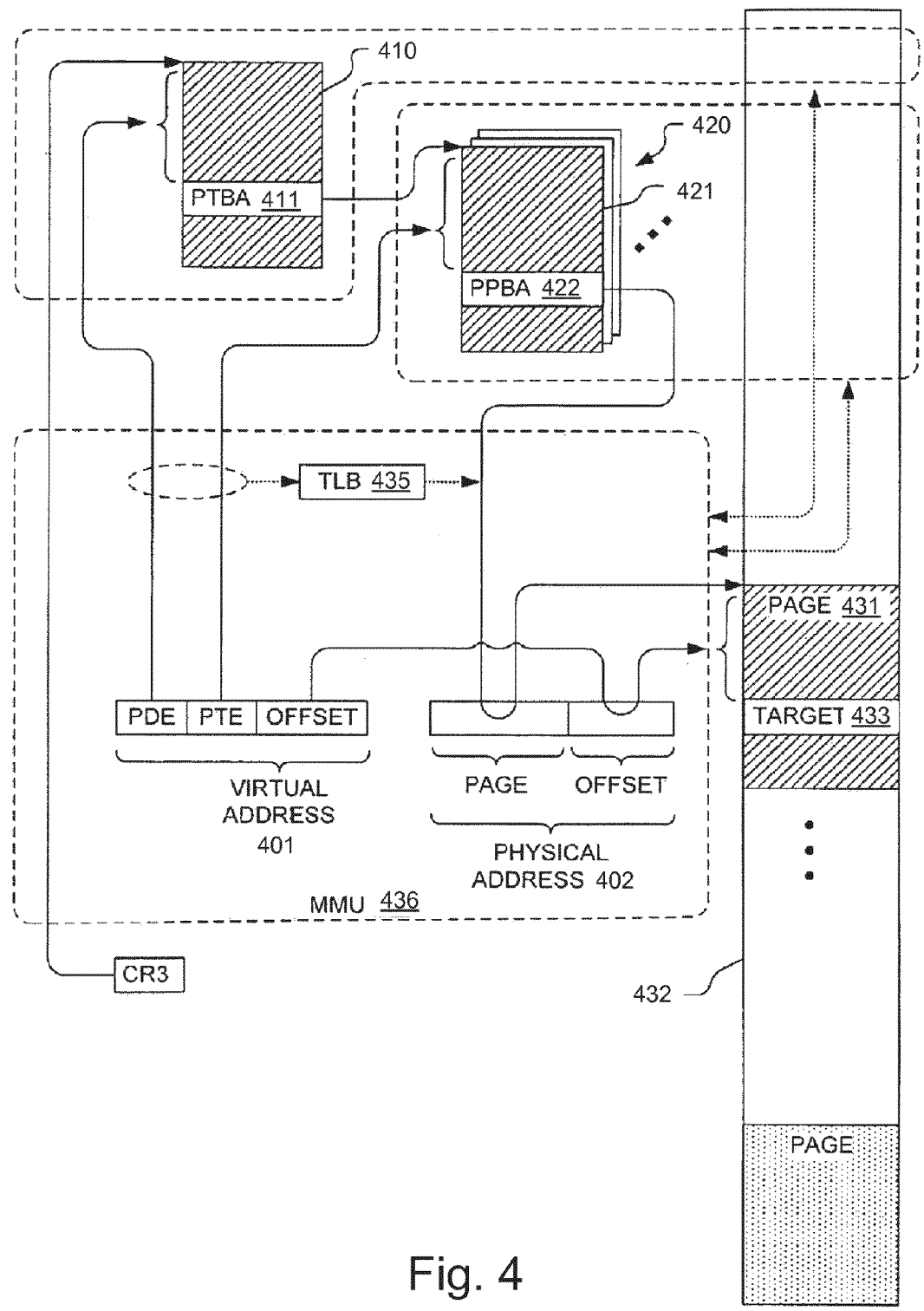
FIG. 4 illustrates how virtual memory addresses can be translated to addresses in a physical address space in a typical x86-type architecture, useable in an exemplary embodiment of the present invention.

By way of example only, FIG. 4 illustrates how virtual memory addresses can be translated to addresses in a physical address space in a typical x86-type architecture, useable in an exemplary embodiment of the present invention. It will be understood by one skilled in the art that the means of virtual address translation discussed herein does not limit the scope of the monitoring system 100.

As shown in FIG. 4, a 32-bit virtual address 401 can includes constituent portions that are treated as a 10-bit page directory entry (PDE) index, a 10-bit page table entry (PTE) index, and a 12-bit page offset (OFFSET). The respective indices can be used in a two-level mapping scheme that employs a 1024-entry page directory 410, indexed using the PDE index, to retrieve a corresponding page table base address (PTBA) 411, which can identify a 1024-entry page table 420, such as exemplary page table 421. The exemplary page table 421 can be indexed using the PTE index portion of virtual address 401 to identify a corresponding physical page base address (PPBA) entry 422, which in turn can identify a page 431 in physical memory 432. Page and offset portions of the mapped physical address 402 can be used to access a particular target location 433 in physical memory 432 based on the virtual address 401.

In the illustrated example, the page directory 410, page tables 420 and individual mapped memory pages such as page 431 are all represented in physical memory 432 as 4-kilobyte-memory pages. Typically, in modern paged virtual memory implementations, a memory management unit (MMU) 436 performs the virtual-to-physical address translations either by walking the page tables 420 or by retrieving cached page mappings from a translation lookaside buffer (TLB) 435. Typically, an operating system 216 maintains, often in conjunction with the MMU 436, contents of the page tables 420 in correspondence with demand paging activity. The MMU uses page mappings coded therein to perform virtual-to-physical address translations in the course of memory accesses performed by the processor 205. As is conventional in x86-type processor architectures, contents of a control register, such as the CR3 register, are used to identify the page directory 410 corresponding to a current execution context and its address space.

Use of the illustrated page mappings can be understood as follows: When the MMU 436 receives a virtual address 401, the MMU 436 can determine whether there is an entry in the TLB 435 that provides a mapping for the virtual address 401 to a corresponding physical page number. In the illustrated context, a combination of PDE and PTE portions of the virtual address 401 can be considered a virtual page number. Therefore, the TLB 435 can map 40-bit virtual page numbers to 40-bit physical page numbers, although other configurations are possible as well. Typically, the TLB 435 is implemented as a content addressable store in which a subset of virtual-to-physical page number mappings is cached. If the TLB 435 contains an entry that matches the virtual page number for the virtual address 401, the MMU 436 can use this cached mapping to obtain the corresponding physical page number. Otherwise, the MMU 436 can walk the page tables to locate the virtual page number and physical mapping.

To walk the page tables, MMU 436 identifies a page directory corresponding to the current context and indexes first into the page directory and then into a page table 420. Exemplarily, in the illustration of FIG. 4, the PDE portion of virtual address 401 is used as an index into the page directory 410, while the PTE portion of the virtual address 401 is used as an index into the page table 421. More specifically, a 40-bit value retrieved from control register CR3 is used as the upper 40 bits, a 10-bit value from the PDE portion of virtual address 401 is used as the next lower address bits, and the last two address bits are set to 0 to form the 32-bit address in physical memory 432 of the PTBA entry 411. In turn, the PTBA entry 411 is used to identify the page table 421, and the PTE portion of the virtual address 401 is used as an index into the identified page table 421. More specifically, a 40-bit value obtained from the PTBA entry 411 is used as the upper address bits, a 10-bit value from the PTE portion of virtual address 401 is used as the next lower address bits, and the last two address bits are set to 0 to form the 32-bit address in physical memory 432 of the PPBA entry 422. Finally, the PPBA entry 422 is used to identify the mapped page 431, and the offset portion of the virtual address 401 is used as an offset into the mapped page 431. More specifically, a 40-bit value obtained from the PPBA entry 422 is used as the upper address bits and the 12-bit offset portion of virtual address 401 is used as the lower address bits to form the 32-bit address in physical memory 432 of the target location 433.

Page directories are typically page-aligned, and in x86-type processor designs, 40 bits from control register CR3 are sufficient to uniquely identify a 4-kilobyte page that encodes the page directory for the current execution context. Page tables 420 and, of course, the pages themselves are also page aligned. Therefore, 40-bit page table base addresses, e.g., PTBA 411, and physical page base addresses, e.g., PPBA 422, are also sufficient in the illustrated configuration. Thus, entries in the illustrated page directories and tables are 32 bits, and the additional bits are generally available to code appropriate and desirable attributes, such as, for examples, validity of the entry, types of access allowed for the corresponding page, whether the corresponding page has been modified or referenced since loaded into physical memory 432, whether caching is disabled, or whether the corresponding page must remain in physical memory 432.

In general, page mapping state is dynamic and constantly changing in accordance with demand paging activity, based on context switches and, in some cases, based on explicit instructions (e.g., flush, invalidate, etc.) executed by operating system or application code. Relative to demand paging, as virtual-to-physical page translations are performed, some page mappings may indicate that corresponding data is not currently present in physical memory 432. In this case, the MMU 436 can generate a page fault that, once serviced, results in the needed data being loaded into physical memory 432 and corresponding changes made in the page tables 420. For example, if at the time that the MMU 436 attempts to map virtual address 401, corresponding data does not actually reside in physical memory 432, the PPBA entry 422 will so indicate. As a result, corresponding data can then be loaded from backing storage and the PPBA entry 422 can be updated to identify the page in physical memory 432 into which the data is loaded. In this manner, either initially or eventually based on operation of a page fault handler, a mapped physical page frame can contains data corresponding to a virtual address 401. Since physical memory is finite, the preceding sequence can typically displace data that previously resided in the page frame and both the PPBA entry 422 and other page mapping information corresponding to the now displaced data can also be updated.

Generally, memory management facilities of an operating system are responsible for creating and maintaining page tables 420 in memory accessible for use by the MMU 436. The MMU 436 or operating system memory management facilities are generally responsible for managing contents of the TLB 435, so that recently or frequently obtained mappings between virtual page numbers and physical page numbers are cached. Typically, demand paging activity will result in changes to the TLB contents. In addition, mappings can be flushed from the TLB 435, e.g., in connection with a context switch, or can be individually invalidated, e.g., when a corresponding memory page is unmapped.

For example, when a mapping for a particular virtual page number is not contained within the TLB 435 and a page table walk is performed, the MMU 436 typically evicts an entry from the TLB 435 to free up space for a new entry for the current mapping. The virtual page number is cached in the newly available entry of the TLB 435, along with the physical page number obtained from the page table walk (and any demand paging). In general, when an entry in TLB 435 is evicted, the bit indicating whether the page has been modified is typically copied from the evicted entry to the corresponding entry in page tables 420.

A challenge in the virtualization of modern computer architectures is creation and maintenance of memory mapping information in shadow page tables, maintained by the hypervisor 120. In general, shadow page tables encode virtual-to-physical memory mappings usable by a MMU 436 or other facility of underlying hardware in mapping memory access targets of instructions executed on behalf of a guest computation. Typically, the guest computation is aware of mappings to an apparent physical address space of a guest VM 110, but is unaware of actual mappings to an address space in underlying physical memory.

Thus, while mappings encoded in shadow page tables can correspond to mappings maintained by a guest operating system 216 in conventional page tables, e.g., guest page tables, shadow page tables can go a step further, completing the mapping to addresses in underlying physical memory. To understand why this further mapping is relevant, it is important to recognize that the guest operating system 216, or an execution context thereof, need not be aware that it executes on a guest VM 110. Accordingly, the guest operating system 216 and its execution contexts maintain and view the guest page tables 420 as representing operant virtual-to-physical memory mappings, even though the mapped-to "physical" addresses are really addresses in a space on the guest VM 110, which is itself virtualized. Such guest page table mappings can therefore be understood as mappings from guest virtual page numbers to Guest physical page numbers, which can be further mapped by the hypervisor 120 to actual physical addresses.

As discussed above, paging based virtual memory can be facilitated by page tables, for mapping virtual addresses to physical addresses. When an instruction is executed, the current page table can be used to perform address translations. The operating system 216 can create a separate page table for each process, so that a process can have its own virtual memory address space in which to operate.

Figure 5:
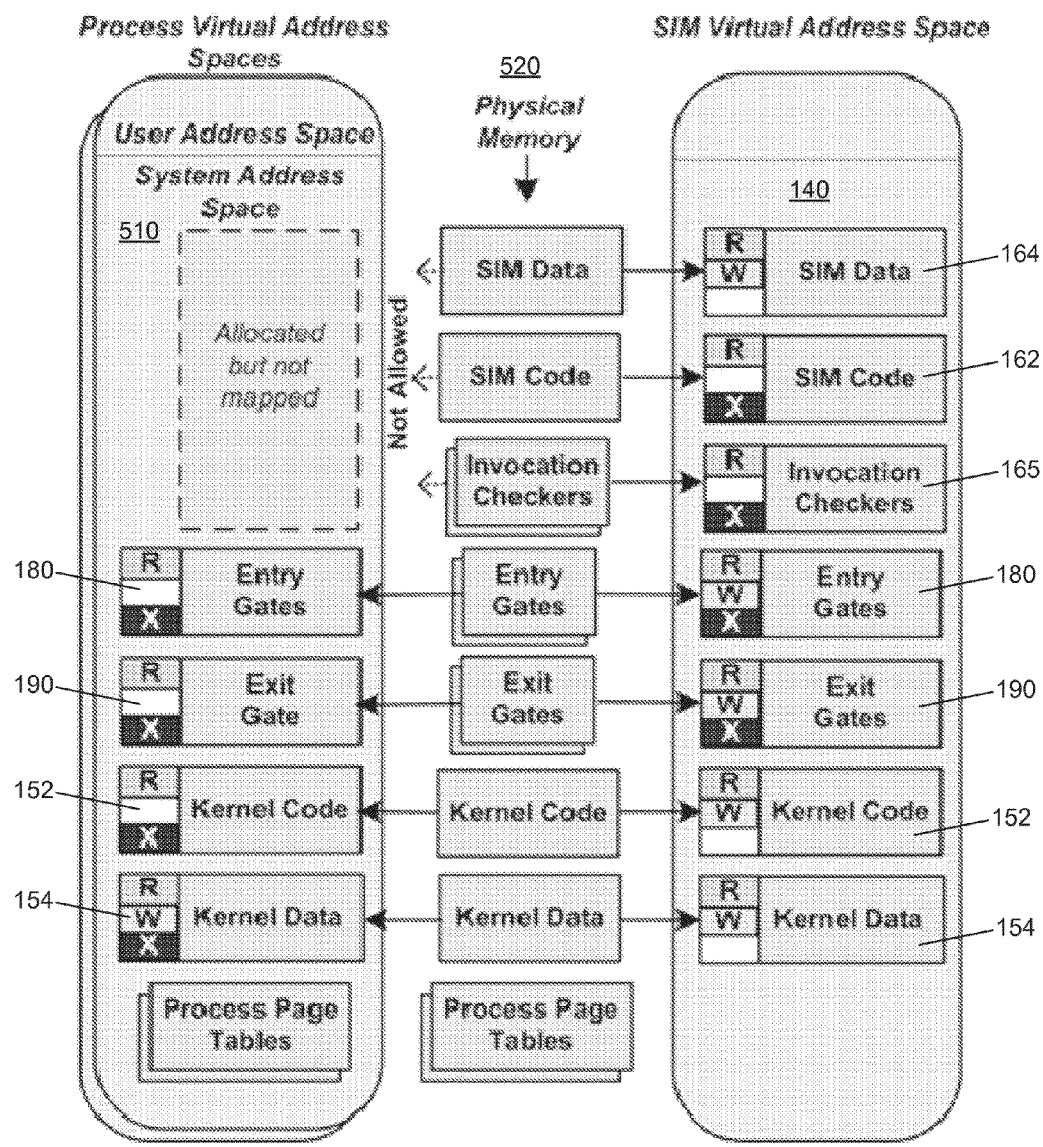
FIG. 5 illustrates memory mapping for a guest virtual machine, according to an exemplary embodiment of the present invention.

FIG. 5 illustrates memory mapping for the guest VM 110 and its hidden address space 140, according to an exemplary embodiment of the present invention. As shown in FIG. 5, a process address space 510 can be defined by the operating system 216 for each executing process. In FIG. 5, an exemplary process address space 510 is shown in the left, while the hidden address space 140 is shown on the right. The guest memory 520, seen to the guest VM 110 as physical memory, corresponding to these address spaces 510 and 140 are represent in the middle of the diagram.

Generally, as shown in FIG. 5, the kernel 150 can be mapped into a fixed address range in each process's address space 510. All pages containing kernel code 152 can have read and execute privileges, to enable the kernel 150 to execute its functionality as needed for the process to operate. But the kernel code 152 can be write-protected, especially in places where hooks are placed, so as to limit modifications of the kernel 150 by untrusted processes.

As mentioned earlier, the entry and exit gates 180 and 190 can be used to perform transitions between the system address space 130, in which the process address space 510 exists, and the hidden address space 140. Since the gates include code, they can be set with execute permissions but can be made read only so that they cannot be modified from with the guest VM 110.

The hidden address space 140 can include the security monitor code 162 and data 164. In addition to the security monitor 160, the hidden address space 140 can contain all the contents of the system address space 130 that are mapped to the hidden address space 140. However, some of the permissions can be set differently, for the monitoring system 100 to behave as desired. The kernel code 152 and data 134 regions do not have execute permissions. This means that while execution is within the hidden address space 140, no code mapped in from the system address space 130 can be executable. Thus, any unauthorized modifications to the kernel 150, such as by a malicious rootkit, cannot execute in the hidden address space 140 to modify the security monitor 160. Invocation checkers 165, which can identify the processes in which hooks are triggered to call the entry gate 180, can also be contained only in the hidden address space 140 and can have execution privileges.

Because the system address space 130 contents can be mapped into the hidden address space 140, an important requirement for the mapping to work can be to ensure that other, i.e., the additional, regions in the hidden address space 140, e.g., the security monitor code 162, security monitor data 164, and the invocation checker 165 regions, do not overlap with the mapped-in regions from the system address space 130. There are at least two methods by which this can be achieved. First, the virtual address range that is used for user programs may be used for allocating the hidden address space 140 regions. This approach is suitable for security monitors 160 that will be primarily used to monitor kernel level code 132. Second, operating system functionality can be utilized to allocate memory from the system address space 130. Once allocated, any legitimate code, such as the operating system 216 itself, should not attempt to use this memory region in the system address space 130.

Since the hidden address space 140 contains all kernel code 152 and data 134, along with the security monitor code 162 and data 164 in its address space, the instructions as part of the security monitor 160 can access the kernel 150 regions at native speed. This satisfies the performance requirement of the monitoring system 100, by not requiring a privilege transfer to switch focus between the kernel 150 and the security monitor 160. The memory mapping method we have introduced also satisfies the isolation security requirement, by having the security monitor code 162 and data 164 regions in a separate hidden address space 140, not directly accessible by the executing kernel 150 in the system address space 130. Any kernel-level instruction executing in the guest operating system 216 will utilize the system address space, which do not include these security monitor 160 regions. Although any kernel-level code 132 executing in the operating system 216 environment can have full freedom to change the process virtual memory mappings, because they are mapped into the system address space 130, kernel-level code 132 cannot modify or alter the hidden address space 140. By design, a hidden page table for the hidden address space 140 is neither included in the system address space 130, nor in the hidden address space 140. This we will be discussed in more detail later in this disclosure.

In the Intel x86 processors, the CR3 register can contain the physical address of the root of the current page table data structure. In the two-level paging mechanism supported in the IA-32 architecture, the root of the page table structure is called the page directory. As part of the process context switching mechanism, the content of the CR3 register can be updated by the kernel 150 to point to appropriate page table structures used by the current process. Although the kernel 150 of the operating system 216 mainly maintains the valid CR3 values to switch among processes, any code executing with the kernel-level privilege can modify the CR3 register to point to a new page table. However, to ensure the correct operation of the operating system 216, kernel code 152 needs to see its expected CR3 values.

In conventional virtual machines, the page tables in the guest VM 110 are not used for translating virtual addresses to physical addresses, because the physical memory that needs to be translated to is on the host, which can be maintained and shared among various VM's by the hypervisor 120. In conventional virtualization, the hypervisor 120 can take complete control over the guest operating system 216 memory management by intercepting all accesses to the CR3 register. The guest physical memory then only becomes an abstraction utilized by the hypervisor 120 for maintaining correct mapping to the host physical address. Shadow page tables can be used by the hypervisor 120 to map guest virtual to host physical memory. The hypervisor 120 can thus give the guest operating system 216 the illusion that the operating system's designated page tables are being used.

Since an exemplary embodiment of the monitoring system 100 requires the switching of address spaces, the CR3 register can be modified directly to this end. However, the modifications to the CR3 register by the guest VM 110 are typically trapped by the hypervisor 120. The monitoring system 100, however, can bypass the hypervisor 120 invocation, so that the desired performance requirement, i.e., reduction of privilege-transfers, can be satisfied.

To enhance performance, the monitoring system can utilize a hardware virtualization feature available in Intel VT. By default each access to the guest CR3 register by the guest VM 110 can cause a VMExit, which is a switch from the guest VM 110 to the hypervisor 120. Intel VT includes a target list (CR3_TARGET_LIST) maintained by the hypervisor 120. A modification to the CR3 register does not trigger a VMExit if the CR3 is being switched to one of the page table structure's root addresses in the target list. The number of values this list can store varies from model to model, but the Core 2 Duo and Core 2 Quad processors support a maximum of four trusted CR3 values in the CR3_TARGET_LIST.

Figure 6:
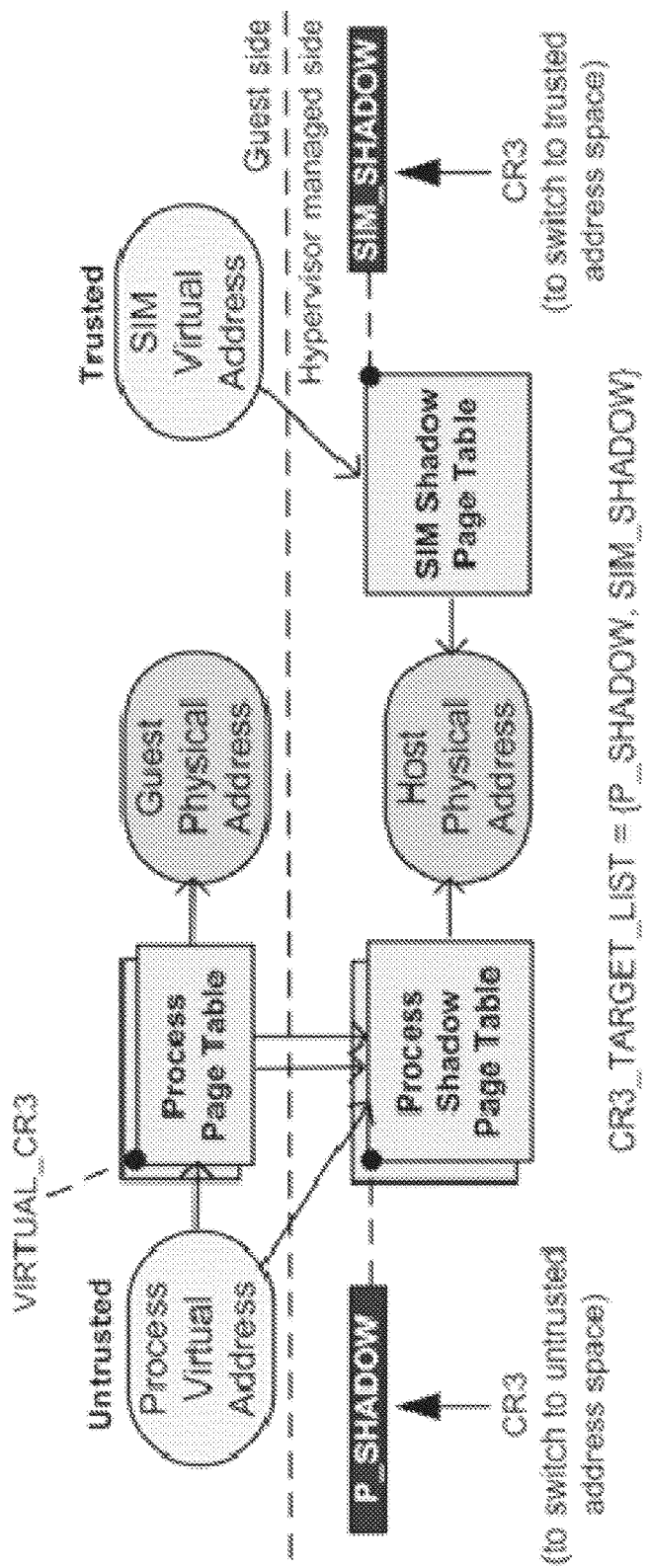
FIG. 6 illustrates how the switching is performed between standard and hidden virtual address spaces by updating the CR3 register, according to an exemplary embodiment of the present invention.

The guest operating system 216 can provide the addresses of guest page directories in the CR3 register, and the correct execution of the guest VM 110 is ensured by the hypervisor's modifying the addresses to the appropriate shadow page directories instead. However, when the monitoring system 100 bypasses the hypervisor 120 while switching CR3 values, the system 100 needs to directly switch between shadow page directories. FIG. 6 illustrates how the switching is performed by updating the CR3 register. Besides the hypervisor-maintained shadow page table structures, the monitoring system 100 can also utilize a specialized shadow page table, referred to herein as a secure shadow page table. The secure shadow page table converts virtual addresses in the hidden address space 140 to host physical addresses. Since it is directly maintained in the hypervisor 120 and the security monitor 160 need not manage its virtual memory, no guest level page table for the hidden address space 140 need be provided. The root of the secure shadow page table structure can be a secure shadow page directory, which can be designates as SIM_SHADOW. The physical address of the current secure shadow page directory maintained by the hypervisor 120 can be designated as P_SHADOW. Switching between the process address space 510 and the hidden address space 140 can be required to directly modify the CR3 register and to load the value of SIM_SHADOW or P_SHADOW, after already adding them to the CR3_TARGET_LIST. This ensures the correct operation of the code in the guest VM 110 when the hypervisor 120 remains uninvolved. The entry and exit gates 180 and 190 can perform this switching, as will be described below, and the rest of the design of the monitoring system 100 can ensure that the switching is transparent to the guest operating system 216.

Figure 7:
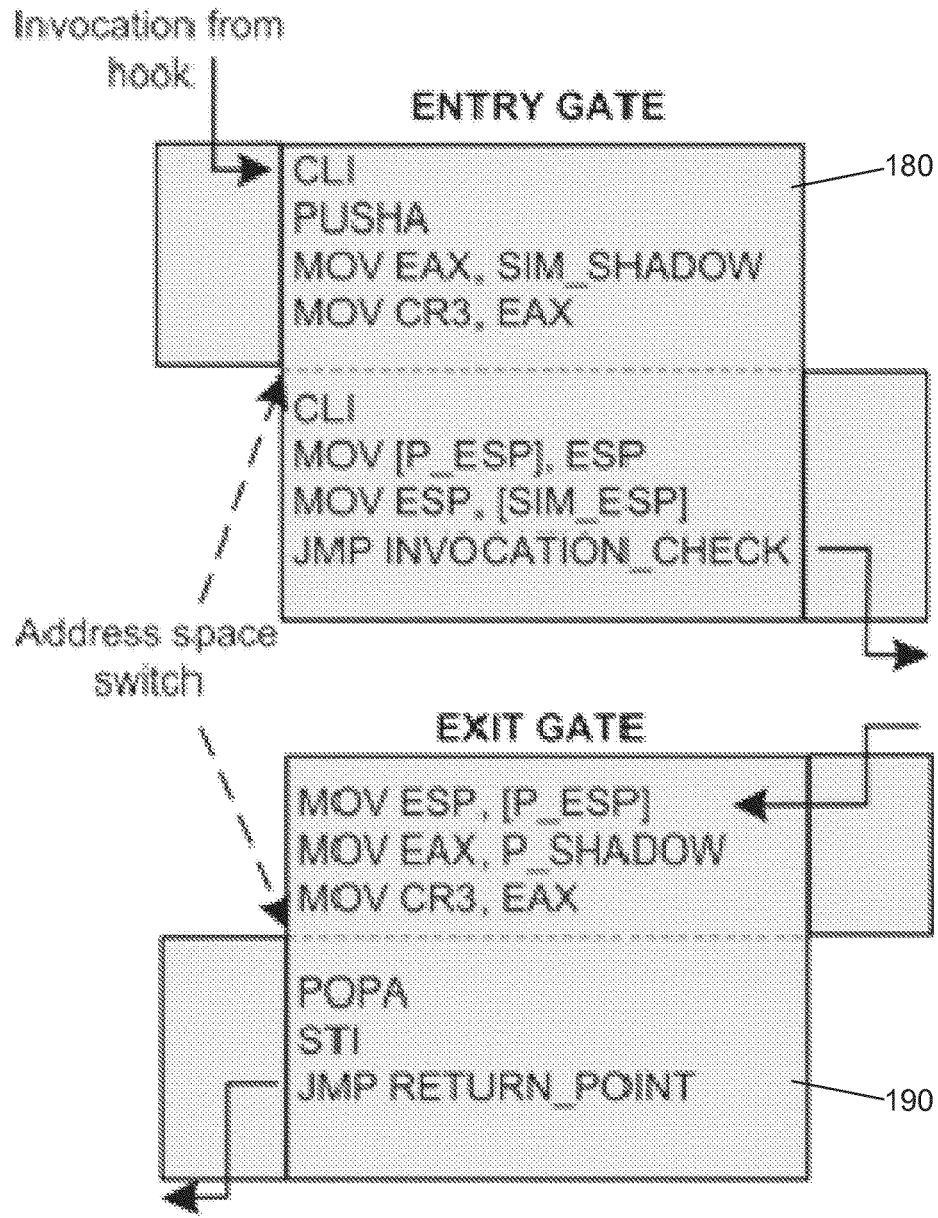
FIG. 7 illustrates contents of an entry gate and an exit gate for accessing the hidden virtual address space, according to an exemplary embodiment of the present invention.

The entry and exit gates 180 and 190 can be the only regions that are mapped into both the system address space 130 and the hidden address space 140 in pages having executable privilege. This ensures that a transfer between the address spaces 130 and 140 can only happen through code contained in these pages. Moreover, since these pages are write-protected by the hypervisor 120, the contents of the gates 180 and 190 cannot be modified by any in-guest VM 110 code. Exemplary contents of the entry and exit gates 180 and 190 are shown in FIG. 7.

Each hook and associated handler can correspond to a pair of corresponding entry and exit gates 180 and 190. The task of an entry gate 180 can be to first set the CR3 register with the physical address of the secure shadow page directory, or SIM_SHADOW. This action can switch focus into the hidden address space 140. Since the CR3 register cannot be directly loaded with data, the value of SIM_SHADOW first needs to be moved to a general purpose register. For this reason, all register values can be saved to the stack, so that the security monitor 160 can access register contents at the point when the hook was reached. Even though the register contents are saved on the stack in the system address space 130, since interrupts are disabled by the entry gate 180 already, an attacker will not be able to regain execution and modify the values before entry into the hidden address space 140. Once in the hidden address space 140, the next task is to switch the stack to a region contained in the security monitor 160 by modifying the ESP register. The stack switching may be necessary, so that code executing in the hidden address space 140 does not use a stack provided by the untrusted guest kernel-level code 132. Otherwise, an attacker can select an address in the form of the stack pointer that may overwrite parts of the security monitor 160 once in the hidden address space 140. Finally, control can be transferred to the invocation checker routine 165 to verify where the entry gate 180 was invoked, which will be discussed in more detail below.

The first instruction executed in the entry gate 180 can be the CLI to stop interrupts from executing. This can guarantee that execution is not diverted to somewhere else due to interrupts. The reason for executing the same CLI instruction again after entering the hidden address space 140 is discussed further below.

The exit gate 190 can perform a transfer out of the hidden address space 140 into the process address space 510. When called, the exit gate 190 can first switch the stack back to the stack address saved by the entry gate 180. To make the address space switch, the exit gate 190 can load the CR3 register with the address in P_SHADOW, which can be the physical address of the shadow page table root. The hypervisor 120 may be using multiple process shadow page tables and switching between them as necessary. To ensure correct system state, the value of P_SHADOW can be equal to the address of shadow page directory being used by the hypervisor 120 just prior to entering the hidden address space 140. Querying the hypervisor 120 for the correct value during monitor invocation violates the performance requirement of the monitoring system 100, so instead, the hypervisor 120 can update the value of P_SHADOW used in the exit gate 190 when the hypervisor 120 switches from one process shadow page table to another during normal process switches. These calls to the hypervisor are common to conventional in-VM monitoring and need not be avoided to achieve similar performance as conventional in-VM monitoring. Having the value of P_SHADOW as an immediate operand in every exit gate 190 would require the hypervisor 120 to perform several memory updates. Instead, storing it as a variable in the hidden address space 140 can require only one memory update by the hypervisor 120 at the time of shadow page table switches. At the end of the exit gate 190, the interrupt flag can be cleared to enable interrupts again, and then execution can be transferred to a designated point, usually immediately after the hooked location. The exit gate 190 can have write permissions in the hidden address space 140, enabling the security monitor 160 to control where the execution is transferred back.

The entry gates 180 can be the only way to enter the hidden address space 140, and each entry gate 180 can first transfer control to the appropriate invocation checking routine 165, which can then call a handler 168 routine in the security monitor 160. By doing so, the monitoring system 100 can ensure the security requirement, i.e., isolation of the security monitor 160.

To satisfy the security requirement of isolation, immediately after the hidden address space 140 is entered through one of the entry gates 180, the invocation of the entry gate 180 can be checked to ensure that the invocation was from a hook that is allowed to call the entry gate 180. A challenge is that, because the entry gate 180 is visible to the system address space 130, a branch instruction can jump to this location from anywhere within the system address space 130. Moreover, the monitoring system 100 preferably does not rely on call instructions and checking the call stack, because these are within the system address space 130 and, as such, cannot be trusted. The monitoring system 100 can instead utilize a hardware debugging feature available in the Intel processors after Pentium 4 to check the invocation points. This feature, which is called last branch recording, can store the sources and targets of the most recently-occurred branch instructions in one or more predetermined processor registers.

The last branch recording feature can be activated by setting the LBR flag in the IA32_DEBUGCTL MSR. Once this flag is set, the processor 205 can record a running trace of a fixed number of last branches executed in a circular queue. For each of the branches, the instruction pointer (IP) at the point of the branch instruction and its target address are stored as a pair. The number of these pairs that can be stored in the LBR queue varies across the x86 processor families. However, all families of processors since Pentium 4 record information about a minimum of four last branches taken. These values can be read from the MSR registers, MSR_LAST-BRANCH_k_FROM_IP and the MSR_LASTBRANCH_k_TO_IP, where k is a number from 0 to 3.

The monitoring system 100 can check the branch that transferred execution to the entry gate 180 using the LBR information. In the invocation checking routine 165, the second most recent branch can be the one that was used to invoke the entry gate 180. The monitoring system 100 can check that the source of the branch corresponds to a hook 170 that is allowed to call the entry gate 180. Although the target of the branch instruction can also be available, the monitoring system 100 need not verify the target if the source matches. As will be discussed late, the monitoring system 100 can also mitigate possible attacks that may jump into the middle of the entry gate 180 and attempt to divert execution before invocation checking routine is initiated.

A conceivable attack may be an attempt to modify these MSR registers in order to bypass the invocation checks. Thus, the monitoring system 100 can preferably stop malicious modifications to these MSR, but at the same time ensure that the desired performance requirement is not violated. With Intel VT, read and write accesses to MSR registers can selectively cause VMExits by setting the MSR read bitmap and MSR write bitmap, respectively. Using this feature, the monitoring system 100 can set the bitmasks in such a way that write attempts to the IA32_DEBUGCTL MSR and the LBR MSRs are intercepted by the hypervisor 120 but read attempts are not. Since the invocation checking routine 165 only needs to read the MSRs, performance is therefore not affected.

In an exemplary embodiment, the security monitor code 162 need not rely on any code from any untrusted region, such as any region outside of the hidden address space 140. Therefore, the security monitor code 162 can be completely self-contained. To this end, any necessary library routines can be statically linked with the code 162, and the security monitor 160 does not call any kernel 150 functions. Mapping the kernel code 152 and data 134 with non-execute privileges, as discussed above, can ensure that even any accidental execution of untrusted code does not occur in the trusted, hidden address space 140, because execution on non-execute code and data results in a software exception. Any software exceptions occurring while in the hidden address space 140 can be is handled by code residing in security monitor 160. Moreover, the entry and exit from the SIM address space can be considered an atomic execution from the perspective of the untrusted guest operating system 216. While the hypervisor 120 can receive and handle interrupts on the guest operating system's behalf, the guest VM 110 need not be notified of interrupts while interrupts are disabled in the guest VM 110. Disabling interrupts before entering and after exit can ensure that interrupts do not divert the intended execution path of the security monitor 160, which can guarantee the desired security requirement. Even without using the code of the guest operating system 216, the same functionality provided by an out-of-VM approach can be achieved in our design.

By disallowing kernel 150 functions to be called, the security monitor 160 needs to traverse and parse the data structures in the system address space 130 in order to extract necessary information required for enforcing or verifying a security state of the untrusted region. However, this is the same semantic gap that exists while using introspection to analyze data structures of the untrusted guest VM from a separate trusted guest VM. The method of identifying and parsing data structures used in existing out-of-VM approaches can therefore be ported to this secure in-VM approach with few modifications.

Additionally, the security monitor 160 may need to perform accesses to hardware or perform I/O for usability purposes instead of handling the events in the untrusted guest operating system 216. Theoretically, it may be possible to replicate the relevant guest operating system 216 functionality inside the hidden address space 140. However, accessing hardware directly may interfere with the guest operating system 216. Instead, because the hidden address space 140 can be trusted, the monitoring system 100 can define a layer to communicate with the hypervisor 120 for operating-system-like functionality through hypercalls. This layer, referred to as the SIM API, can provide functionalities such as, for examples, memory management, disk access, file access, and additional I/O. This layer can be developed as a library that can be statically or dynamically linked with the security monitor code 162 based on the implementation. The handling of the SIM API can be performed in the hypervisor 120 or by a separate trusted guest VM. Since the security monitor 160 can be designed to use such functionality less often than handling events in the untrusted guest kernel 150, the cost of hypervisor 120 invocation can be kept low even for fine-grained monitoring.

An exemplary embodiment of the monitoring system 100 can be initialized by a guest VM 110 component implemented as a Windows driver, executed after a clean boot, when the guest operating system 216 can be considered to be in a trusted state. The primary task of the initialization driver is to allocate guest virtual memory address space for placing the entry and exit gates 180 and 190 based on the hooks 170 required, initiate creation of hidden virtual address space 140, initiate the loading of the security monitor 160 into the hidden address space 140, and finally initiate the creation of entry gates 180, exit gates 190, and invocation checking routines 165. The initialization driver can communicate with the hypervisor 120 counterpart of the monitoring system 100 using hypercalls, for example, the VMCALL instruction of Intel VT.

An early task of the monitoring system 100 can be to reserve virtual address ranges in the system address space 130 for use in entry and exit gate 180 and 190 creation. Because the monitoring system 100 need not guarantee that the normal operation of the operating system 216 and legitimate applications do not attempt to utilize the reserved address ranges, the monitoring system 100 can allow the guest operating system 216 to allocate virtual address space. The driver can allocate contiguous kernel-level memory from the non-paged pool by using the MmAllocateContiguousMemory kernel function. This function can return the virtual address pointing to the starting of this allocated memory region. Because the function allocates memory from the Windows non-paged pool, it can be guaranteed by the operating system 216 to be never paged out. In other words, the pages can be mapped to guest physical frames that are not used until they are freed. Because the memory is already allocated, any legitimate application will not try to utilize this address space. The allocated virtual address space region is informed to the hypervisor 120 component using a predefined hypercall notifying the starting address and the size of the allocated region. During execution, the monitoring system 100 can check for any malicious attempts to utilize this address space or changes in memory mapping.

A next step can be creation of the hidden address space 140 by the hypervisor 120 component. After the hypervisor 120 is informed about the memory allocation, the secure shadow page table structure can be created.

A final task is to create the relevant routines to perform switching into the hidden address space 140. The security monitor 160 can require hooking into the kernel 150 for invoking the handlers 168. Various forms of hooking are known in the art and can be utilized by the security monitor 160. For each hook 170 and corresponding handler 168, a hypercall can be performed by the driver to inform the hypervisor 120 about the hook 170 instruction, the handler's address, and the address to return execution to after the handler 168 executes. For each received hypercall, the hypervisor 120 component can generate an entry gate 180, an invocation check routine 165, and an exit gate 190. The invocation checking routine 165 can be modified to verify the invocation instruction address to be the hook 170 instruction address provided with the hypercall. A jump instruction can be placed at the end invocation routine 165 to jump to the provided handler 168. The exit gate 190 code can also be modified to return execution to the specified address. The address of the entry gate 180 can be returned, so that the driver can modify the hook 170 to divert execution to the entry gate 180.

Embodiments of the monitoring system can thus provide secure and efficient monitoring of untrusted processes from within a same virtual machine as the untrusted processes. While the monitoring system has been disclosed in exemplary forms, many modifications, additions, and deletions may be made without departing from the spirit and scope of the system, method, and their equivalents, as set forth in the following claims.

What is claimed is:

1. A security system comprising:
   a virtual machine;
   a kernel executing inside the virtual machine;
   a virtual memory inside the virtual machine comprising a plurality of standard virtual address spaces and a hidden virtual address space, wherein the standard virtual address spaces are directly accessible by the kernel, and wherein the hidden virtual address space is hidden from the kernel;
   a hypervisor at a higher privilege level than the virtual machine;
   a processor having a control register and being configured to execute program code, wherein the processor transitions from the standard virtual address spaces to the hidden virtual address space exclusively through an entry gate, and wherein the processor transitions from the hidden virtual address space to the standard virtual address spaces exclusively through an exit gate;
   a page table base target list comprising a list of target physical addresses including a first physical address of the hidden address space and a second physical address of a current process in the standard address spaces, wherein a modification of a control register to one of the target physical addresses is performed absent a call to the hypervisor, and wherein modification of the control register to a value outside the target list requires a call to the hypervisor;
   the entry gate comprising program code for modifying the control register to point to the first physical address of the hidden address space; and
   the exit gate comprising program code for modifying the control register to point to the second physical address of the current process.

2. The security system of claim 1, further comprising a security monitor having code and data both contained in the hidden virtual address space, wherein access to the security monitor is obtained through the entry gate.

3. The security system of claim 2, further comprising one or more hooks in the kernel, each hook corresponding to a handler in the security monitor, and each hook being configured to invoke the corresponding handler by calling the entry gate.

4. The security system of claim 3, further comprising an invocation checker configured to verify the authenticity of a hook calling the entry gate.

5. The security system of claim 1, wherein the kernel manages one or more virtual page tables for each of the standard virtual address spaces, the hypervisor comprising:
one or more standard shadow pages corresponding to the standard virtual address spaces and the virtual page tables; and
a secure shadow page corresponding to the hidden address space.

6. The security system of claim 1, the target list being a hardware feature of the security system.

7. The security system of claim 1, the control register being a CR3 register.

8. The security system of claim 1, the hypervisor being configured to modify the target list to include an address of the current process.

9. A security system comprising:
a virtual machine;
a virtual memory in the virtual machine, the virtual memory comprising one or more standard address spaces and a hidden address space;
a security monitor having code and data within the hidden address space;
an operating system executing in the virtual machine, the operating system managing one or more virtual page tables corresponding to the standard address spaces, wherein the hidden address space is hidden from the operating system;
a hypervisor at a higher level of privilege than the virtual machine, the hypervisor comprising one or more standard shadow pages corresponding to the virtual page tables and the standard address spaces, and the hypervisor further comprising a secure shadow page corresponding to the hidden address space;
a processor having a CR3 register and being configured to execute program code in the standard address spaces and in the hidden address space, wherein the processor transitions from the standard address spaces to the hidden address space exclusively through a first entry gate, and wherein the processor transitions from the hidden address space to the standard address spaces exclusively through a first exit gate;
a CR3 target list comprising a list of target physical addresses including a first physical address of the hidden address space and a second physical address of a current process in the standard address spaces, wherein a modification of the CR3 register to one of the target physical addresses is performed absent a call to the hypervisor, and wherein modification of the CR3 register to a value outside the target list requires a call to the hypervisor;
the first entry gate comprising program code for modifying the CR3 register to point to the first physical address of the hidden address space; and
the first exit gate comprising program code for modifying the CR3 register to point to the second physical address of the current process.

10. The security system of claim 9, further comprising a plurality of hooks in the operating system, each hook corresponding to a handler in the security monitor, wherein triggering of a first hook calls the entry gate to invoke the corresponding first handler in the security monitor.

11. The security system of claim 10, further comprising an invocation checker in the hidden address space, the invocation checker being configured to authenticate the first hook when the first hook calls the entry gate.

12. The security system of claim 9, the first entry gate being configured to call an invocation checker in the hidden address space after modification of the CR3 register to the physical address of the hidden address space, and the invocation checker being configured to verify appropriateness of entry into the hidden address space, and being further configured to call the security monitor.

13. A security method comprising:
establishing a hidden address space in a virtual machine, the hidden address space being hidden from a kernel running in the virtual machine;
configuring a hypervisor to manage a shadow page table for mapping the hidden address space to physical memory;
establishing an exclusive entry gate for entering the hidden address space from a standard address space accessible to the kernel, the entry gate comprising program code for modifying a CR3 register to point to the hidden address space;
establishing an exclusive exit gate for returning to the standard address space from the hidden address space, the exit gate comprising program code to modify the CR3 register to point to a calling process from which the entry gate was called; and
modifying a CR3 target list to include a physical address of the hidden address space, wherein the target list represents addresses to which the CR3 register can be modified absent a call to the hypervisor, wherein the entry gate is configured to transition from the standard address space to the hidden address space absent a call to the hypervisor, and wherein the exit gate is configured to transition from the hidden address space to the standard address space absent a call to the hypervisor.

14. The security method of claim 13, further comprising:
providing a security monitor in the hidden address space, the security monitor being hidden from the kernel; and
providing a hook in the kernel;
wherein the security monitor comprises a handler corresponding to the hook, and wherein triggering the hook calls the entry gate to access the handler in the security monitor.

* * * * *